(12) United States Patent
Ermanoski

(10) Patent No.: US 9,586,190 B1
(45) Date of Patent: Mar. 7, 2017

(54) THERMAL SWING REACTOR INCLUDING A MULTI-FLIGHT AUGER

(71) Applicant: Sandia Corporation, Albuquerque, NM (US)

(72) Inventor: Ivan Ermanoski, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 176 days.

(21) Appl. No.: 14/278,350

(22) Filed: May 15, 2014

Related U.S. Application Data

(60) Provisional application No. 61/823,480, filed on May 15, 2013.

(51) Int. Cl.
| | | |
|---|---|---|
| *B01J 8/08* | (2006.01) | |
| *B01J 19/20* | (2006.01) | |
| *B01J 19/12* | (2006.01) | |
| *C01B 3/06* | (2006.01) | |
| *B65G 33/14* | (2006.01) | |
| *C01B 31/18* | (2006.01) | |
| *B01J 8/00* | (2006.01) | |

(52) U.S. Cl.
CPC ............ *B01J 8/087* (2013.01); *B01J 8/002* (2013.01); *B01J 19/127* (2013.01); *B01J 19/20* (2013.01); *B65G 33/14* (2013.01); *C01B 3/063* (2013.01); *C01B 31/18* (2013.01); *B01J 2208/00451* (2013.01); *B01J 2219/00144* (2013.01); *Y02E 10/41* (2013.01); *Y02E 10/44* (2013.01)

(58) Field of Classification Search
CPC B01J 19/127; B01J 19/20; B01J 2219/00144; B01J 8/002; B01J 8/0087; B01J 8/085; B01J 2208/00451; Y02E 10/41; Y02E 10/44
See application file for complete search history.

(56) References Cited

U.S. PATENT DOCUMENTS

| | | | |
|---|---|---|---|
| 7,314,131 B2 | 1/2008 | Olds | |
| 8,420,032 B1 * | 4/2013 | Ermanoski | ............... B01J 8/087 422/198 |

* cited by examiner

*Primary Examiner* — Lessanework Seifu
(74) *Attorney, Agent, or Firm* — Daniel J. Jenkins

(57) ABSTRACT

A thermal swing reactor including a multi-flight auger and methods for solar thermochemical reactions are disclosed. The reactor includes a multi-flight auger having different helix portions having different pitch. Embodiments of reactors include at least two distinct reactor portions between which there is at least a pressure differential. In embodiments, reactive particles are exchanged between portions during a reaction cycle to thermally reduce the particles at first conditions and oxidize the particles at second conditions to produce chemical work from heat.

12 Claims, 2 Drawing Sheets

THERMAL SWING REACTOR INCLUDING A MULTI-FLIGHT AUGER

CROSS-REFERENCE TO RELATED APPLICATIONS

This application claims benefit of U.S. Provisional Patent Application No. 61/823,480, "Multi-Flight Auger for Solar Thermochemical Fuel Production", filed May 15, 2013, which is incorporated by reference herein in its entirety.

GOVERNMENT INTERESTS

Embodiments of the invention were developed under Contract No. DE-AC04-94AL85000 between Sandia Corporation and the U.S. Department of Energy. The United States Government has certain rights in this invention.

TECHNICAL FIELD

Embodiments of the present invention relate to a material conveyor and more particularly relates to a multi-flight auger reactor for thermal swing processing.

BACKGROUND

Solar concentration systems typically entail optics (mirrors or lenses) to focus a large area of sunlight, or solar thermal energy, onto a small area. The solar thermal energy may drive a heat engine, such as a steam turbine, which may be further coupled to an electrical power generator to convert a portion of the solar thermal energy into electricity. Solar concentration systems may also drive a thermochemical reaction to generate a fuel that chemically stores a portion of the solar thermal energy. Water splitting, gasification of coal, and reforming of methane are all under investigation as potential solar thermochemical fuel production techniques. Solar concentration systems may drive other important reactions on an industrial scale as well, such as $CO_2$ reduction into CO, for example.

Many solar thermochemical reactions entail a redox cycle. In a water splitting reaction to produce hydrogen from water, a metal-oxide redox pair is thermally reduced and the reduced reactive media then drives decomposition of water. The metal oxide is then reduced again to repeat the cycle. While identifying advantageous metal-oxides is currently a subject of research, thermodynamic considerations dictate the thermal reduction portion of the cycle generally requires a high temperature, typically between 1000-2000° C., depending on the reactive oxide chosen and other conditions in the system.

Solar thermochemical reactors can take many forms, affording more or less efficient fuel production, scalability, etc. One conventional system utilizes a honeycomb substrate that is coated with the reactive oxide. The honeycomb substrate is alternately exposed to collected solar energy to heat the system and reduce the reactive oxide, and to a reactant gas, such as $H_2O$ in the case of water splitting, to generate fuel. Such a reactor is essentially a fixed bed, and as such, suffers temperature non-uniformities and low thermal efficiency because much of the solar energy is expended on heating non-reactive portions of the bed (e.g., honeycomb substrate) and is ultimately rejected from the system as waste heat, rather than utilized for fuel production. Also, with each redox cycle, the entire system undergoes extreme thermal cycling, leading to component fatigue.

Additionally, other thermal swing process systems and methods may benefit from more cost efficient and productive systems and methods for heating the process material.

A system which avoids many of the difficulties and efficiency limitations associated with existing reactors would advantageously advance the art of thermal swing processing, and in particular, solar thermochemical fuel production.

SUMMARY OF THE DESCRIPTION

According to an embodiment of the disclosure, an apparatus is disclosed that includes a first reaction zone operating a first temperature; a second reaction zone operating at a second temperature; and a particle transport component capable of moving particles from the first reaction zone to the second reaction zone. The first reaction zone includes a window capable of receiving sunlight from a sunlight source and a high temperature zone heated by the received sunlight. The first reaction zone further includes a first auger within a casing, and wherein the first auger comprises a flight that transports particles from a particle collection zone to the high temperature zone when the casing is rotated.

According to another embodiment of the disclosure, a solar reactor system is disclosed that includes a solar collection system comprising at least one mirror; and a swing reactor having an opening for receiving sunlight directed by the at least one mirror. The swing reactor includes a first reaction zone operating a first temperature; a second reaction zone operating at a second temperature; a particle transport component capable of moving particles from the first reaction zone to the second reaction zone. The first reaction zone includes s a window capable of receiving sunlight from a sunlight source and a high temperature zone heated by the received sunlight. The first reaction zone further includes a first auger in a casing, and the first auger includes a flight that transports particles from a particle collection zone to the high temperature zone when the casing is rotated.

According to another embodiment of the disclosure, a method is disclosed that includes transporting particles from a particle collection zone at a first temperature to a first reaction zone operating at a first reaction temperature by rotating a casing surrounding an auger having a flight capable of moving the particles; transporting particles from the first reaction zone to a bottom portion of an inner cylinder of the auger; transporting particles to a second reaction zone operating at a second reaction temperature less than the first reaction temperature. Heat is transferred from particles being transported from the first reaction zone to the bottom portion of the inner cylinder of the auger to particles being transported from the particle collection zone to the first reaction zone. The first reaction temperature is greater than the first temperature; and the particles are heated to the first reaction temperature in the first reaction zone by concentrated solar energy.

An object of the present invention is to provide a reactor that conveys solid particulate materials between process volumes operating at different temperatures while conveying solid particulate materials between process volumes operating at different temperatures.

Another object of the present invention is to recover heat between material flows.

Another object of the present invention is to increase the efficiency of a swing reactor.

An advantage of the present invention is to increase process energy efficiency via heat recovery between process steps while conveying solid particulate materials between process volumes operating at different temperatures.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instruments and combinations particularly pointed out in the appended claims.

DETAILED DESCRIPTION OF THE DISCLOSURE

Described herein are multi-flight auger reactors and methods for thermal swing, processing. Thermal swing processes include thermochemical, thermo-adsorption and other process that include changing the physical and/or chemical properties of a material by changing process temperature. Thermochemical systems and processes include, but are not limited to the $CO_2$ and water splitting and associated fuel production processes. Thermo-adsorption systems and processes include, but are not limited to $CO_2$ and water capture.

In the following description, numerous details are set forth. It will be apparent, however, to one skilled in the art, that the present invention may be practiced without these specific details. In some instances, well-known methods and devices are shown in illustration form, rather than in detail, to avoid obscuring the present invention. Reference throughout this specification to "an embodiment" means that a particular feature, structure, function, or characteristic described in connection with the embodiment is included in at least one embodiment of the invention. Thus, the appearances of the phrase "in an embodiment" in various places throughout this specification are not necessarily referring to the same embodiment of the invention. Furthermore, the particular features, structures, functions, or characteristics may be combined in any suitable manner in one or more embodiments. For example, a first embodiment may be combined with a second embodiment anywhere the two embodiments are not mutually exclusive.

The terms "coupled" and "connected," along with their derivatives, may be used herein to describe structural relationships between components. It should be understood that these terms are not intended as synonyms for each other. Rather, in particular embodiments, "connected" may be used to indicate that two or more elements are in direct physical or electrical contact with each other. "Coupled" my be used to indicated that two or more elements are in either direct or indirect (with other intervening elements between them) physical or electrical contact with each other, and/or that the two or more elements co-operate or interact with each other (e.g., as in a cause and effect relationship).

Figure 1:
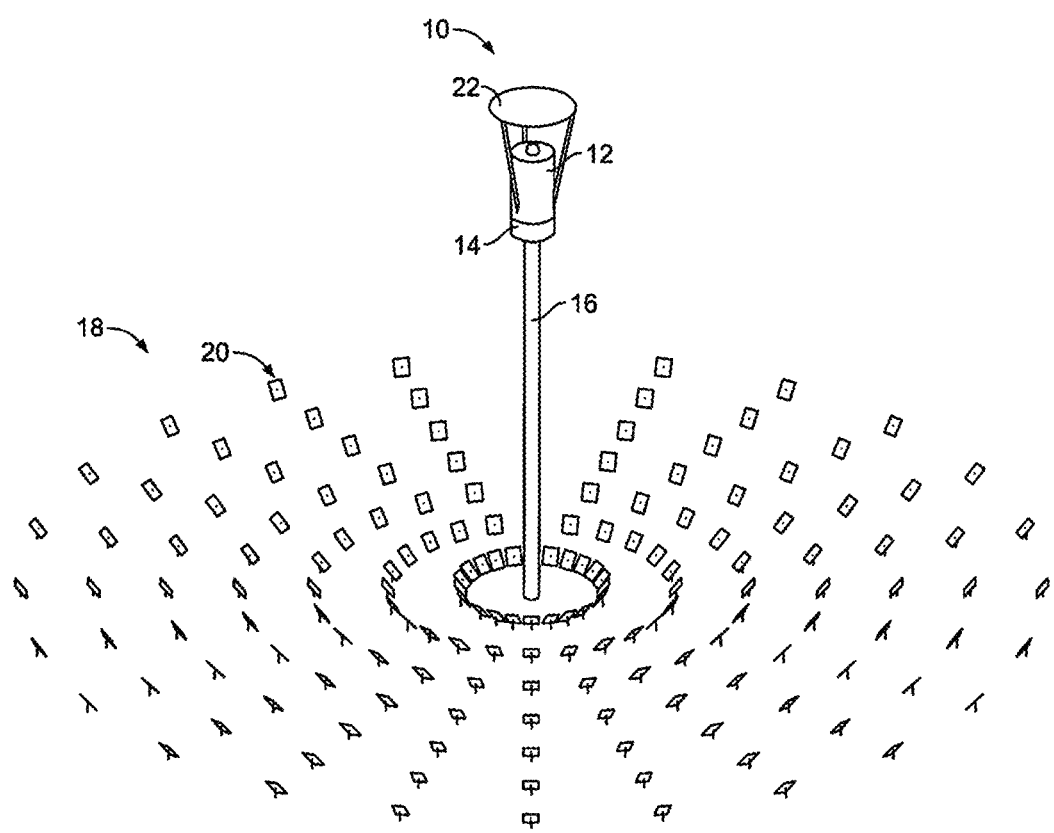
FIG. 1 shows an embodiment of a solar thermochemical system according to the disclosure.

FIG. 1 illustrates a thermal swing system 10 according to an embodiment of the disclosure. As can be seen in FIG. 1, the thermal swing system 10 includes a thermal swing reactor 12, a component housing 14, a reactor support 16 and a solar collection system 18. The component housing 14 includes components such as, but not limited to pumps, motors, piping and other devices (not shown) to operate the thermal swing reactor 12. In another embodiment, one or more of the components may be housed external to the housing 14. In this exemplary embodiment, the component housing 14 is adjacent the swing reactor 12. In another embodiment, the component housing 14 may be not adjacent the swing reactor, and may be co-located with or adjacent to the swing reactor 12, or may be remotely located, for example, on the ground or in the reactor support 16.

In this exemplary embodiment, the reactor support 16 is a cylindrical, vertical support capable of elevating the thermal swing reactor 12 and the component housing 14. In another embodiment, the reactor support 16 may be a tower or other structure capable of elevating the thermal swing reactor 12.

The solar collection system 18 includes a plurality of mirrors 20 and a reflector 22. In another embodiment, the solar collection system 18 may include one or more mirrors. The mirrors 20 direct solar energy to the reflector 22, where the concentrated solar energy is directed to the thermal swing reactor 12. The solar collection system 18 may include control components for moving and/or positioning the mirrors 20.

Figure 2:
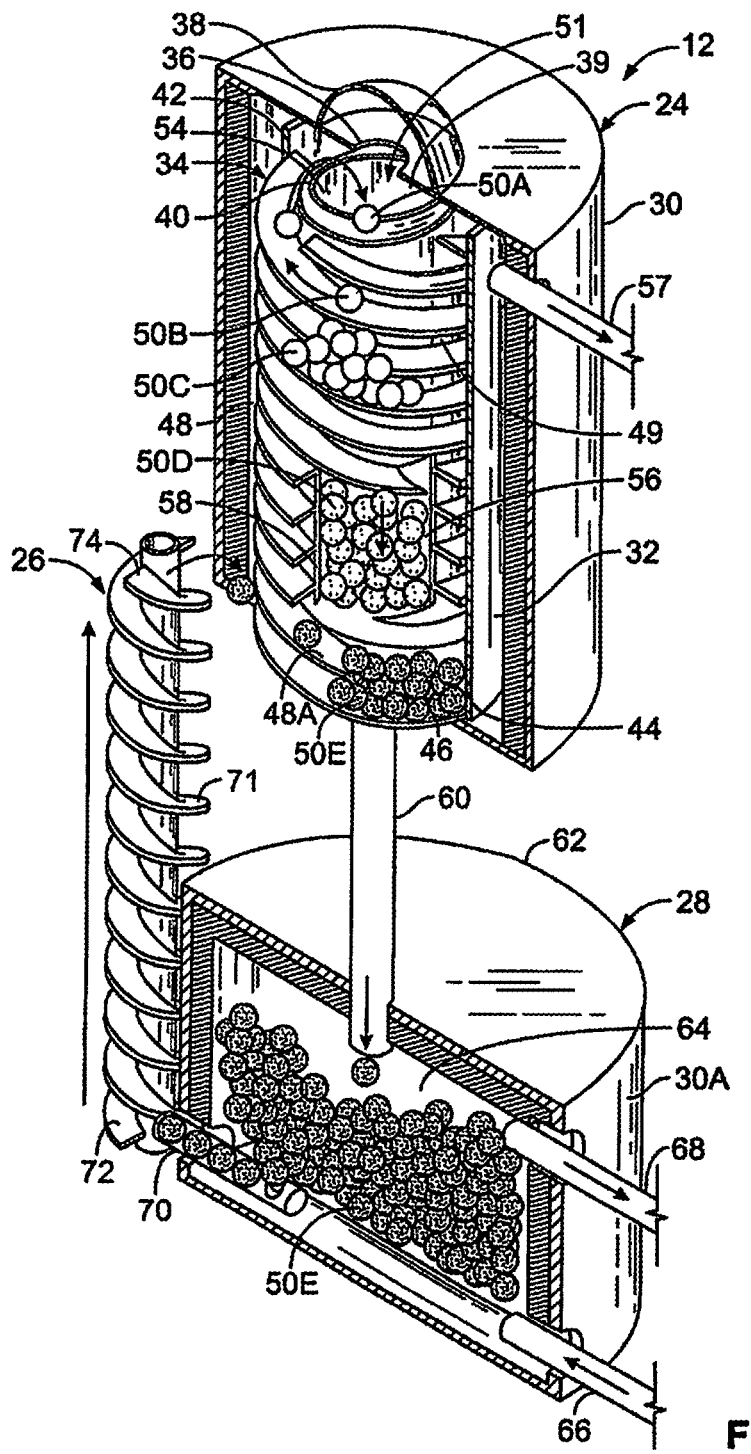
FIG. 2 shows a partial cut-away view of primary internal components of a swing reactor according to an embodiment of the invention.

FIG. 2 shows an exemplary illustration of the primary internal components of the swing reactor 12 of FIG. 1 according to an embodiment of the disclosure. FIG. 2 does not show piping, conduits, such as fluid conduits, particle conduits, mechanical coupling components, seals, and drive couplings and gears, of the swing rector 12, in order to simplify the drawing for clarity, and as the use of these components in operation of the primary internal components would be clearly understood by one of ordinary skill in the art.

As can be seen in FIG. 2, the swing reactor 12 includes a particle heater/reduction component 24, a particle transport component 26 and an oxidation reactor component 28. The particle heater/reduction component 24 may be referred to as the reduction reactor. The oxidation reactor component 28 may be referred to as the oxidation reactor.

The reduction reactor 24 includes a housing 30, a casing 32 and a stationary ramp device or auger 34. The housing 30 includes an aperture 36 having a window 38 that allows sunlight to pass through with minimum attenuation and reach the interior 39 of the housing 30, and in particular, to reach a top portion 40 of the auger 34.

The casing 32 is positioned within the housing 30 and around the auger 34 in such a manner as to allow the casing 32 to rotate within the housing 30 and around the auger 34. The casing 32 has a top end 42 and a bottom end 44. The top end may be referred to as the high temperature zone 42. The bottom end 44 has a particle collection zone 46. The casing 32 is coupled to a drive mechanism (not shown) capable of rotating the casing 32 within the housing 30 and around the auger 34.

The auger 34 includes a spiral ramp or flight 48 surrounding an inner cylinder 49. The inner cylinder 49 includes an inner passage 51 that has an entrance 54 and a bottom collection zone 56.

When the casing 32 is rotated, particles 50 are moved from the particle collection zone 46 onto the flight 48 and then up the flight 48 towards the top end 42 of the casing 32. The particles 50 are pushed and by the force of the rotating casing 32 moving the particles 50 towards and up the flight 48 as the casing continues to apply force against the particles 50. The particles 50 are pushed to the high temperature zone 42, where the particles are heated by concentrated solar energy. When the particles 50 reach the top of the flight 48, the particles are pushed by trailing particles into the entrance 54 of the inner passage 51, where the particles proceed to fall or travel down the inner passage 51 to the bottom collection zone 56 of the inner passage 51. In an embodiment, the particles undergo a reduction reaction in the high temperature zone 42, and reduced gas products may exit the high temperature zone 42 via an exit 57.

As the particles 50 pass down through the inner passage 51, the particles 50 transfer heat to particles 50 being raised on the flight 48. The particles 50 include the highest temperature particles 50A, second highest temperature particles 50B, third highest temperature particles 50C, second coolest particles 50D (these particles can be seen as the auger 34 has been partially cut away to see the inner passage 51), and coolest particles 50E. It should be noted that FIG. 1 shows only a portion of the particles 50 in order to simplify the drawing for clarity. In operation, the internal space between the casing 32 and the inner cylinder 49 may be filled with particles.

The bottom collection zone 56 has an outlet (not shown) that allows particles 50 to pass into a conduit 60. The conduit 60 transports particles 50 to the oxidation reactor 28. The oxidation reactor 28 includes a housing 62 containing an oxidation zone 64. The oxidation zone 64 has an inlet 66 and an outlet 68. The inlet 66 allows for gas reactants to enter the oxidation zone 64 and be oxidized. The outlet 68 allows for oxidation products to exit the oxidation zone 64.

The oxidation reactor 28 includes an oxidation reactor housing 30A and a particle outlet 70 that allows coolest particles 50E to exit the oxidation reactor 28 and be received by the particle transport component 26. In this exemplary embodiment, the particle transport component 26 also has an auger configuration including a flight 71 that rotates and transports particles 50 from an initial or low position 72 to a final or high position 74, where they are introduced into the particle collection zone 46 via a cold particle inlet (not shown). A coupling to rotate the particle transport component 26 is not shown in order to simplify the drawing for clarity, and as the use of these components in operation of the primary internal components would be clearly understood by one of ordinary skill in the art.

In such a manner the particles 50 are cycled between high, reduction temperature in the high temperature zone 42 of the oxidation reactor 28 and low, oxidation temperature in the oxidation zone 64 of the oxidation reactor 28.

The reactive particles applicable to the systems and techniques described herein may generally be of any type known for thermochemical reactions that are further suitable for conveyance by the systems and techniques described herein. Although the reactive particles are not consumed significantly with each reaction cycle in the exemplary embodiments described herein, one of skill in the art will note the systems and techniques described herein enable particle continuous addition and are therefore readily adaptable to embodiments where the reactive particles may be consumed (e.g., volatilized) and replenished. Reactive particles applicable to the systems and techniques described herein may be a solid media of homogenous or heterogeneous composition (e.g., carrier media coated with reactive media) and of various porosity.

In an embodiment, the particles may be metal oxides facilitating a reduction/oxidation cycle or redox cycle. These particles may metal oxides ($MO_xs$) selected from a group including, but not limited to ceria ($CeO_2$), ferrite, manganite, cobalt oxide, and other known particle composition capable of similar cyclic redox reactions. Reactive particles applicable to the systems and techniques described herein may also vary in size significantly with smaller sizes having higher surface/volume ratios improving reaction rates, but potentially being more susceptible to sintering and/or melting. For one exemplary ceria particle embodiment, particle size is between about 5 µm (microns) and 50 µm (microns).

The reactor may be used in concentrated solar power systems that include, but are not limited to solar thermochemical hydrogen and fuel production, carbon dioxide and water splitting operations, water capture such as from air and flue gas operations, solar augmentation of fossil fuel power plants, and industrial chemical operations. Industrial chemical operations may include, but are not limited to cement manufacture, ore thermolysis, pyrolitic production of charcoal and activated carbon, methanol production, as well as biochar production for soil amendment and carbon sequestration.

In an embodiment, the reactants may be $CO_2$ and the oxidation products may be CO and unreacted $CO_2$, and the reduction product is $O_2$. In this embodiment, the particles may be oxides, such as $CeO_2$, ferrites, perovskites.

In an embodiment, the process may be a water capture process and the reactant may be air, and the oxidation products may be air and water, and the reduction product is water. In this embodiment, the particles may be a MOF or zeolite.

In an embodiment, the process may be a $CO_2$ capture process, and the reactant may be air and the oxidation products may be air and $CO_2$, and the reduction product is $CO_2$. In this embodiment, the particles may be sorption materials, such as zeolites or metal-organic frameworks.

The reactor design enables a high degree of solid-solid heat exchange or heat recovery in an auger used to move or circulate solid particles. Prior art particle beds are very poor thermal conductors, with a coefficient of thermal conductivity typically one to two orders of magnitude less than that of the constituent bulk material, and comparable with the best insulators. It is therefore advantageous, in applications where heat exchange between two particle beds is necessary, to minimize the relevant linear dimensions of the beds, in order to maximize heat flow. Accordingly, the swing reactor of the present disclosure maximizes heat exchange between particles in different temperature/reactant zones by utilizing a vertical conveyor or recilcirculator where particles are moved up a stationary auger by the rotating action of the outside casing, and then discharged down through the hollow auger shaft.

The disclosed swing reactor utilizes an auger with a very short pitch to provide for efficient exchange heat between the two countercurrent flows of particles. An auger with a short pitch minimizes the transfer distance through a (highly insulating) particle bed, and maximizes heat transfer to and through the auger material itself, which is typically a vastly better thermal conductor than a particle bed.

Unfortunately, a very short auger pitch hampers the conveying function of the elevator, since conveying relies on the pressure of the particle bed to keep the particles interlocked together and moving up the auger as (roughly) one unit. In other words, an auger with a very short pitch (compared to the auger diameter) is optimal for the purposes of heat exchange, but cannot convey well or at all. Conversely, a long pitch auger (comparable to the auger diameter) is needed for efficient conveying, but is virtually useless for the purposes of heat exchange.

The multi-flight auger of the present disclosure satisfies both of these requirements, without compromising either function. It uses multiple flights, each having an individual pitch sufficiently large to be consistent with the need for efficient conveying. However, because there are multiple flights (with azimuthally offset starts), the effective distance between flights (i.e. effective pitch) is given as the individual pitch divided by the number of flights. This gives the effective short pitch necessary for efficient heat exchange. The pitch of the auger is determined by the diameter, weight and surface characteristics of the particles.

The operation of a multi-flight auger solid-solid heat exchanger is illustrated by again referring to FIG. 1. In this particular example, the swing reactor 12 is used to recover heat between the two flows of particles 50, one flow of particles 50 moving up the one or more flights of the auger, and the second flow of particles 50 traveling down the inner passage 51 (the hotter particles traveling down the inner passage 51 transferring heat to the cooler particles traveling up the flights). The auger 34 has a start 48A of the flight 48, where the particles 50 are received onto the flight 48 by the pushing motion of the rotating casing 32. In another embodiment, the auger may have one or more flights with corresponding flight starts. In an embodiment, the auger may have four flights azimuthally offset by 90°. In another embodiment, the auger may have two or more flights. In an embodiment, the auger may have ten or more flights. In another embodiment, the auger may have twenty or more flights. At the top of the auger 34, particles 50A are heated and chemically reduced by solar heat. They then move downward and near the auger inner cylinder or shaft 49, by gravity, and transfer heat (via conduction) to the particles 50C being moved up the auger 34, having previously been introduced into it via the cold particle inlet.

According to an embodiment, the aspect ratio of the flights, i.e. the ratio between the effective pitch and the depth of the flights (flight outside radius minus inside radius), is less than about 2. In practice, this means that multi-flight augers with a diameter that is large compared to the effective pitch would have a relatively large shaft, and the flights would occupy the periphery.

According to an embodiment of the present disclosure, the reactor may be used for a two-step metal-oxide redox cycle to produce fuel. Generally, the reactor may be conceptualized as a particle-exchange engine that implements a redox cycle. Reactive particles are exchanged between a thermal reduction portion of the reactor where the particles are reduced (e.g., MO) at first process conditions provided during the operation, and a fuel production portion where the particles are oxidized (e.g., $MO_x$) at second conditions during operation to produce chemical work from solar heating.

The thermal reduction portion thermally reduces reactive particles through direct heating by solar energy to a reduction temperature $T_1$ and a reduction pressure $P_1$. At the operation, reactive particles disposed in the thermal reduction chamber are exposed to a solar energy flux. In the exemplary embodiment, the solar energy flux may be a beam-down and directly irradiates the reactive particles disposed in the thermal reduction portion through an aperture (e.g., quartz window) in the ceiling of the reactor disposed a distance away from the reactive particles to avoid contact. However, any means known in art may be employed to concentrate the solar energy flux to achieve a desired solar power, such as parabolic troughs, dish, power towers, etc., and embodiments of the present invention are not limited in this respect.

For an exemplary ceria particle redox cycle, the reduction reaction of operation proceeds as:

$$1/xCeO_2 \rightarrow 1/xCeO_{2-x} + \tfrac{1}{2}O_2 + \Delta H, \qquad (1)$$

Where $\Delta H$ is the reduction enthalpy of ceria and x is the extent of reduction. Other metal-oxide particles also undergo similar a reaction.

The optimal reduction temperature $T_1$ may vary considerably as a function of the thermal reduction properties of the reactive particle. The extent of reduction x achieved during the operation for a particular reactive particle composition is also a function of the reduction pressure $P_1$ maintained in the thermal reduction portion. Generally the reduction temperature $T_1$ may be expected to be in the range of 1000° C. to 1700° C., and more particularly in the range of 1300° C. to 1600° C. for the exemplary ceria particle with the extent of reduction x increasing for a given reduction temperature $T_1$ as partial pressure of oxygen in the thermal reduction portion decreases. During operation, a vacuum is pulled on the thermal reduction portion to maintain a sub-atmospheric reduction pressure $P_1$ and to extract oxygen ($O_2$) generated by thermal reduction of the reactive particles. For particular ceria particle embodiments, the reduction pressure $P_1$ has a partial pressure of $O_2$ below 100 Pa, and preferably below 10 Pa, where $T_1$ is in the range of 1300° C. to 1600° C. and preferably approximately 1500° C.

In an embodiment, the fuel production portion re-oxidizes the reduced particles at a fuel production temperature $T_2$ and a fuel production pressure $P_2$. During operation, reactive particles disposed in the fuel production portion are exposed to a reactant fluid (a gas or liquid). In an embodiment, the reactant fluid may be steam ($H_2O$) for a water-splitting embodiment, or carbon dioxide ($CO_2$) in an alternative embodiment. The reactive particles undergo a reaction in the presence of the reactant fluid and are reoxidized while the reactant fluid is reduced into fluid reaction products. Depending on the composition of the particle the reaction may be limited to the surface or, as in the case of the exemplary ceria particle which is an oxygen ion conductor, the entire volume of the particle may participate in the reaction.

In an embodiment, the fluid reaction products may be hydrogen ($H_2$) for the water-splitting embodiment, or CO in the alternative embodiment. The fluid reaction products are removed from the reactor as mixed with the reactant fluid. For the exemplary ceria particle, the hydrolysis reaction of operation proceeds as:

$$1/xCeO_{2-x} + H_2O \rightarrow 1/xCeO_2 + H_2 + \Delta Q, \qquad (2)$$

where $\Delta Q$ is the heat released by hydrolysis and x is again the extent of reduction. Other metal-oxide particles also undergo a similar reaction. Collection of the reaction products (e.g., $H_2$) separately from the $O_2$ generated by thermal reduction is facilitated by physically separating the reactions (1) and (2) between the fuel production portion and the thermal reduction portion, respectively.

In advantageous embodiments, the fuel production temperature $T_2$ is below the reduction temperature T1, and in an embodiment at least 300° C. below the reduction temperature $T_1$, and preferably between 300° C. and 600° C. below the reduction temperature $T_1$, to render reduction or fuel production thermodynamically favorable. For the exemplary water splitting embodiment, the temperature differential between $T_1$ and $T_2$ advantageously avoids a need to perform any subsequent separation of $H_2$ from $O_2$. In one exemplary ceria embodiment, operation is performed at a fuel production temperature $T_2$ of approximately 1000° C. In further embodiments, the fuel production pressure $P_2$ is maintained at a pressure higher than the reduction pressure $P_1$. A higher fuel production pressure $P_2$ advantageously improves reactor efficiency because the rate of reaction (2) is directly proportional to pressure. In one exemplary ceria embodiment, the fuel production pressure $P_2$ is at least 1 atm, and preferably about 3-6 atm, at a point where the reactant fluid 240 (e.g., steam) is introduced. In certain embodiments, countercurrent flow of the reactive particles and reactant fluid is provided to maximize the extent of the fuel production reaction.

With the reactor maintaining the thermal reduction portion at a thermal reduction pressure $P_1$ below the fuel production pressure $P_2$ in the fuel production portion during steady state operation of the reactor, the reactor may independently provide optimal processing conditions for the separate operations of the redox cycle. For example, $P_1$ may be designed to achieve a greater extent of reduction x without hampering the fuel production half of the redox cycle.

It is to be understood that the above description is illustrative, and not restrictive. For example, while flow diagrams in the figures show a particular order of operations performed by certain embodiments of the invention, it should be understood that such order is not required (e.g., alternative embodiments may perform the operations in a different order, combine certain operations, overlap certain operations, etc.). Furthermore, many other embodiments will be apparent to those of skill in the art upon reading and understanding the above description. Although the present invention has been described with reference to specific exemplary embodiments, it will be recognized that the invention is not limited to the embodiments described, but can be practiced with modification and alteration within the spirit and scope of the appended claims. The scope of the invention should, therefore, be determined with reference to the appended claims, along with the full scope of equivalents to which such claims are entitled.

What is claimed is:

1. An apparatus, comprising:
   a first reaction zone operating at a first temperature;
   a second reaction zone operating at a second temperature;
   a particle transport component capable of moving particles from the first reaction zone to the second reaction zone;
   wherein the first reaction zone comprises a window capable of receiving sunlight from a sunlight source and a high temperature zone heated by the received sunlight; and
   wherein the first reaction zone further comprises a first auger within a casing, and wherein the first auger comprises a flight that transports particles from a particle collection zone to the high temperature zone when the casing is rotated.

2. The apparatus of claim 1, wherein the auger further comprises an inner cylinder that transports particles from the high temperature zone to a lower portion of the inner cylinder.

3. The apparatus of claim 1, wherein the particle transport component comprises a second auger capable of transporting particles from the second reaction zone to the particle collection zone when rotated.

4. The apparatus of claim 1, further comprising:
   a conduit for transporting particles from a lower portion of an inner cylinder surrounded by the flight to the second reaction zone.

5. The apparatus of claim 1, wherein the particles are formed of a redox reactive material.

6. The apparatus of claim 1, wherein the first temperature is greater than 1000° C.

7. A solar reactor system, comprising:
   a solar collection system comprising at least one mirror; and
   a swing reactor having an opening for receiving sunlight directed by the at least one mirror;
   wherein the swing reactor comprises:
   a first reaction zone operating at a first temperature;
   a second reaction zone operating at a second temperature;
   a particle transport component capable of moving particles from the first reaction zone to the second reaction zone;
   wherein the first reaction zone comprises a window capable of receiving sunlight from a sunlight source and a high temperature zone heated by the received sunlight; and
   wherein the first reaction zone further comprises a first auger in a casing, and wherein the first auger comprising a flight that transports particles from a particle collection zone to the high temperature zone when the casing is rotated.

8. The system of claim 7, wherein the auger further comprises an inner cylinder that transports particles from the high temperature zone to a lower portion of the inner cylinder.

9. The system of claim 7, wherein the particle transport component comprises a second auger capable of transporting particles from the second reaction zone to the particle collection zone when rotated.

10. The system of claim 7, further comprising:
    a conduit for transporting particles from a lower portion of an inner cylinder surrounded by the flight to the second reaction zone.

11. The system of claim 7, wherein the particles are formed of a redox reactive material.

12. The system of claim 7, wherein the first temperature is greater than 1000° C.

* * * * *